Dec. 26, 1961   T. R. STRAWN   3,014,674
AIRCRAFT
Filed Dec. 1, 1959   2 Sheets-Sheet 1
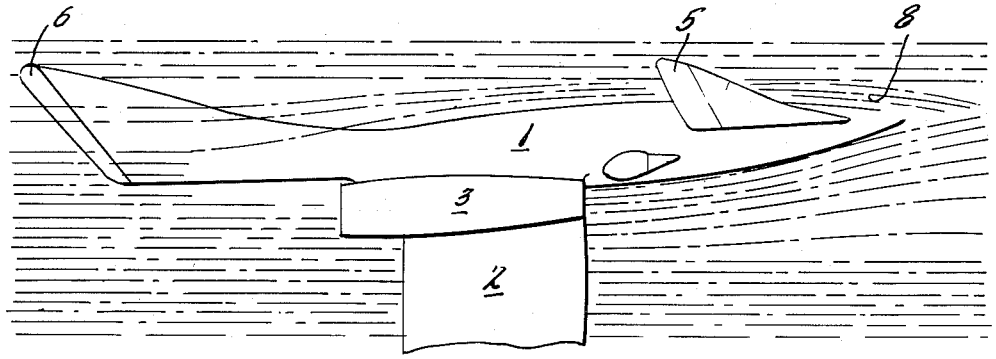
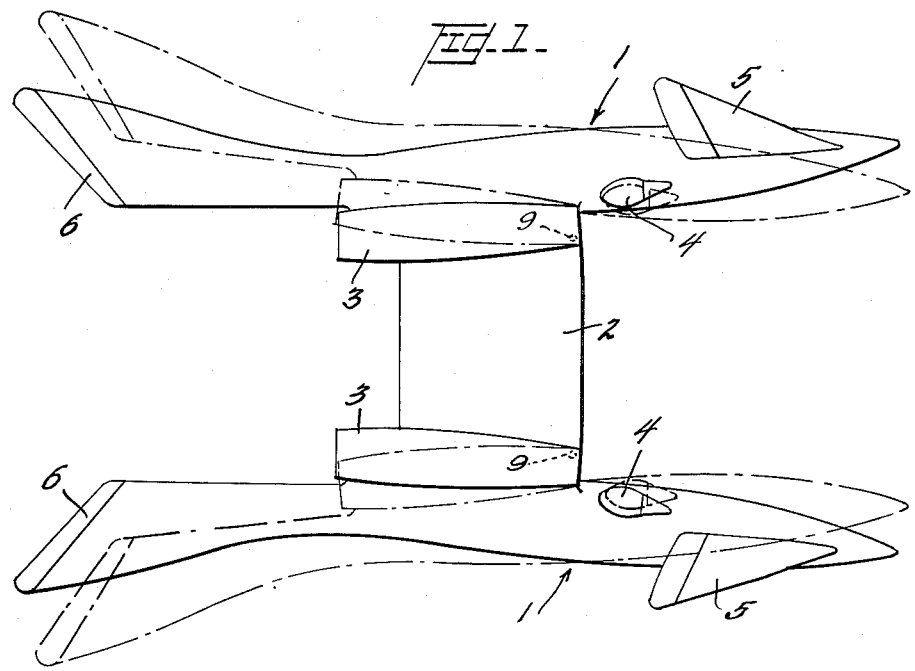
INVENTOR
Theodore R. Strawn,
BY Parker and Welsh,
ATTORNEYS

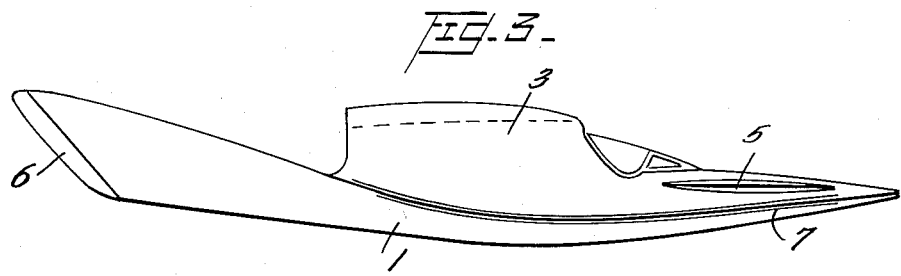
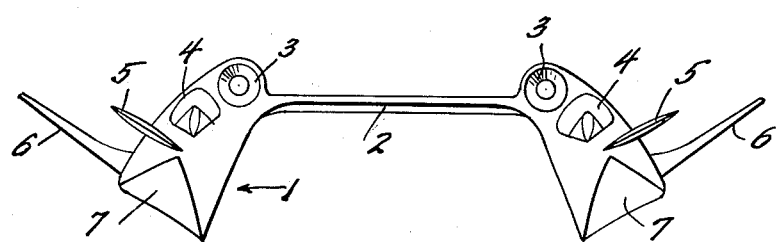
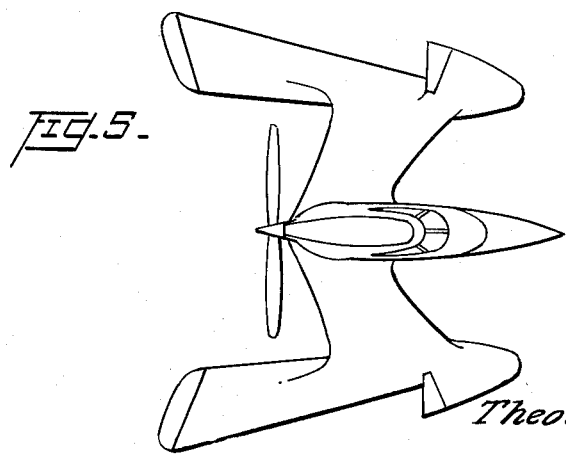

United States Patent Office 3,014,674
Patented Dec. 26, 1961

3,014,674
AIRCRAFT
Theodore R. Strawn, 910 N. Blvd., De Land, Fla.
Filed Dec. 1, 1959, Ser. No. 856,567
5 Claims. (Cl. 244—13)

This invention relates generally to aircraft of the type wherein the major portion of the exposed surface of the craft is designed to contribute to the principal aerodynamic functions, in contradistinction to the more conventional types wherein the fuselage and the laterally extending wings are distinct entities, the wings furnish the lift, and the problems respecting the fuselage design relate mainly to keeping down weight and drag.

In particular, the aircraft of the present invention is of a type having lift surfaces which are elongate in a fore and aft sense and are arranged as a pair in mirror-image symmetry. With such an arrangement, and with proper contouring of the attack surfaces I have found that several distinct advantages accrue, principally enhanced lift, as will appear hereinafter.

It is, therefore, an object of the invention to improve the lift-drag ratio of aircraft. More particularly, it is an object to improve lift by providing for cleaving the air in such manner as to cause a spiralling backwash coacting with airfoil surfaces rearward on the craft. Other objects include improving stability in all three principal directions, providing for more efficient design and location of auxiliary controls, and to provide all of the foregoing while achieving stronger and lighter structural fabrication.

These and other ends are attained by the present invention, one preferred form and one modification of which are shown in the accompanying drawings, in which:

FIGURE 1 is a top plan view, showing also an adjusted position in phantom lines;

FIGURE 2 is a fragmentary portion of FIGURE 1, showing, in broken lines, the pattern of the airflow;

FIGURE 3 is a side elevation as seen from below FIGURE 1;

FIGURE 4 is a front elevation, as seen from the right of FIGURE 1; and

FIGURE 5 is a view in perspective of a modification in which the fuselage has been moved from the outrigger elements to the central, bridge portion.

Referring to the drawing by characters of reference, there is shown, in FIGURES 1 to 4 a twin assembly of outrigger units, indicated generally by the numeral 1, joined by a bridge portion 2 having a airfoil section, and which may or may not be cambered for lift in an attack direction to the right of FIGURE 1. Jet engines 3 are carried by member 1, as best seen in FIGURE 4, and crew or passenger compartments are also included in members 1 behind the cowling 4. Attitude control is attained by a pair of front controls 5 and rear controls 6.

The relatively complex configuration of members 1 is completely apparent only by inspection of FIGURES 1, 3 and 4. FIGURES 3 and 4 show, on the underside of the craft in the fore portion, an inclined region 7 which furnishes an angle of attack to provide a main component of lift. Section 7 being a fixed part of the main body of the craft, the angle of attack will be varied by tilting the craft as a whole by controls 5 or 6 or a combination thereof.

Again referring to FIGURES 3 and 4, it will be noted that lift portion 7 is not only inclined upwardly in a forward direction, but also laterally and outwardly, and this is a highly important feature of the present invention. In the high speed portion behind the jets 3 there is a region of low pressure. The lift region 7, which may be likened to a plowshare, in cleaving the air, brushes it to one side with a build-up of pressure as shown by the crowding of the airflow lines in the region indicated by the numeral 8 in FIGURE 2. It is a consequence of the combined forward and lateral slant of region 7 of the hull 1 that the air in high pressure region 8 will roll spirally up and over the top of the hull, as seas will roll over the rail and onto the deck of vessels having excessive draft. Also contributing to this effect is the angle and curved entering edge of the after, outside surface of the hull, directing the flow of air up and over the hulls, of airfoil cross section, and into the region of the fast moving flow from the power impulse. This provides improvement in lift-drag ratios and stability, and leads to stronger and lighter structures. The structure and functions thus provided will be seen to be radically different from those found in the prior art, such as the straight flow characteristic of the conventional wing of an aeroplane or the rotating fan of a helicopter.

It should be noted that members 1, in addition to their already recited functions, constitute pontoons for water landing and takeoff, and the spiral rolling of the plowed air gives better spray control on the water, due to the wash out of the hull bottom. However, it should be understood that the aerodynamic benefits still obtain even if landing gear for solid ground operation is provided on the craft.

While the embodiment of FIGURES 1 to 4 has been shown as including jet engines, the benefits of the plowed, rolling air mass will also obtain where the air mass is spilled in the stream from any conventional power source, such as an airscrew.

The effects of the spiralling air mass may be varied by changing the attitude of the hull members 1. To illustrate this feature there is shown at 9 on each hull in FIGURE 1, a pivotal arrangement by which the tail portions of hulls 1 may be made to recede from or approach one another. This will be of importance in landings and take-offs.

The craft shown in FIGURE 5 is not materially different aerodynamically from that of FIGURES 1 to 4, but shows the crew and passenger compartment proper on the central, bridge portion and shows propulsion by a conventional airscrew.

While a certain preferred embodiment of the invention has been shown and described, obviously certain modifications may be resorted to and equivalents employed without departing from the proper scope of the invention and I do not, therefore, desire to be limited except as shall appear from the spirit and scope of the appended claims.

I claim:

1. An aircraft comprising a pair of elongate body members, bridge means holding said body members in laterally spaced relation, said body members having continuously, smoothly contoured aerodynamic surfaces, each body including an attack portion comprising a forwardly and upwardly inclined lift surface, said attack portion also comprising a laterally outwardly and upwardly inclined portion, whereby incident air is initially plowed laterally outwardly of said attack surfaces, an aft portion of each body, smoothly contoured with the attack portions to conduct air under pressure from the attack portions further aft, a further aft portion of each body, said further aft portion having a curved entering edge smoothly contoured with its respective first aft portion to lead said air under pressure over the surface of said further aft portion into the rear portion of the region between the two body members and power means on said craft operating in said region whereby conditions of low pressure are created in the rear portion of said region.

2. The combination of claim 1 including attitude elements forwardly and rearwardly on said body members.

3. The combination of claim 1 wherein the further aft portion is extended still further rearwardly in a smoothly contoured manner to form a trailing edge of substantial lateral extent, said trailing edge constituting a portion of the attitude control of the craft.

4. The combination of claim 1 wherein the bridge means connects the two body members in the upper portions of said members and is formed to provide lift to the craft in flight and wherein the two oppositely facing portions of the body members have a generally downward and outward extent from the bridge structure downwardly.

5. The combination of claim 1 wherein the body members are articulated to the bridge section for angular adjustment about vertical axes.

References Cited in the file of this patent

FOREIGN PATENTS

| | | |
|---|---|---|
| 652,942 | Great Britain | May 2, 1951 |
| 57,646 | France | Dec. 30, 1952 |